United States Patent [19]

Ozaki et al.

[11] Patent Number: 4,509,704

[45] Date of Patent: Apr. 9, 1985

[54] FISHING LINE ENGAGING AND RELEASING MECHANISM IN A CLOSED-FACE TYPE REEL

[75] Inventors: Kiyomi Ozaki; Kikuo Tunoda, both of Hiroshima, Japan

[73] Assignee: Ryobi Ltd., Hiroshima, Japan

[21] Appl. No.: 427,035

[22] Filed: Sep. 29, 1982

[30] Foreign Application Priority Data

Nov. 30, 1981 [JP] Japan .................. 56-178905[U]

[51] Int. Cl.³ .............................................. A01K 89/01
[52] U.S. Cl. .............................................. 242/84.2 A
[58] Field of Search ................ 242/84.2 A, 84.21 A

[56] References Cited

U.S. PATENT DOCUMENTS

| | | | |
|---|---|---|---|
| 3,034,741 | 5/1962 | Macy et al. | 242/84.2 A |
| 3,054,571 | 9/1962 | Most | 242/84.2 A |
| 3,498,562 | 3/1970 | Johnson | 242/84.2 A |
| 3,771,740 | 11/1973 | Nepote | 242/84.2 A |

*Primary Examiner*—Billy S. Taylor

*Attorney, Agent, or Firm*—Sughrue, Mion, Zinn, Macpeak and Seas

[57] ABSTRACT

A closed-face type reel has a fishing line latching and releasing mechanism comprising a line pickup member radially movably mounted on a rotor and having a pickup pin movable out of and retractable into a hole defined in a peripheral wall of the rotor for latching and releasing a fishing line to wind up and reel out the same, respectively. The pickup member also includes a tongue engageable with a sleeve mounted on a rotatable and axially movable shaft and normally urged into engagement with the sleeve under the force of a spring acting between the pickup member and the peripheral wall. When the tongue engages the sleeve, the pickup pin projects out of the hole to latch the fishing line. When the tongue disengages from the sleeve, the pickup pin is retracted into the hole to release the fishing line. The pickup member further includes a back portion and a locking portion slidably and removably fitted respectively in a guide hole and a guide slot defined in a sidewall of the rotor. The pickup member can easily be removed from the cover for replacement or repair.

3 Claims, 5 Drawing Figures

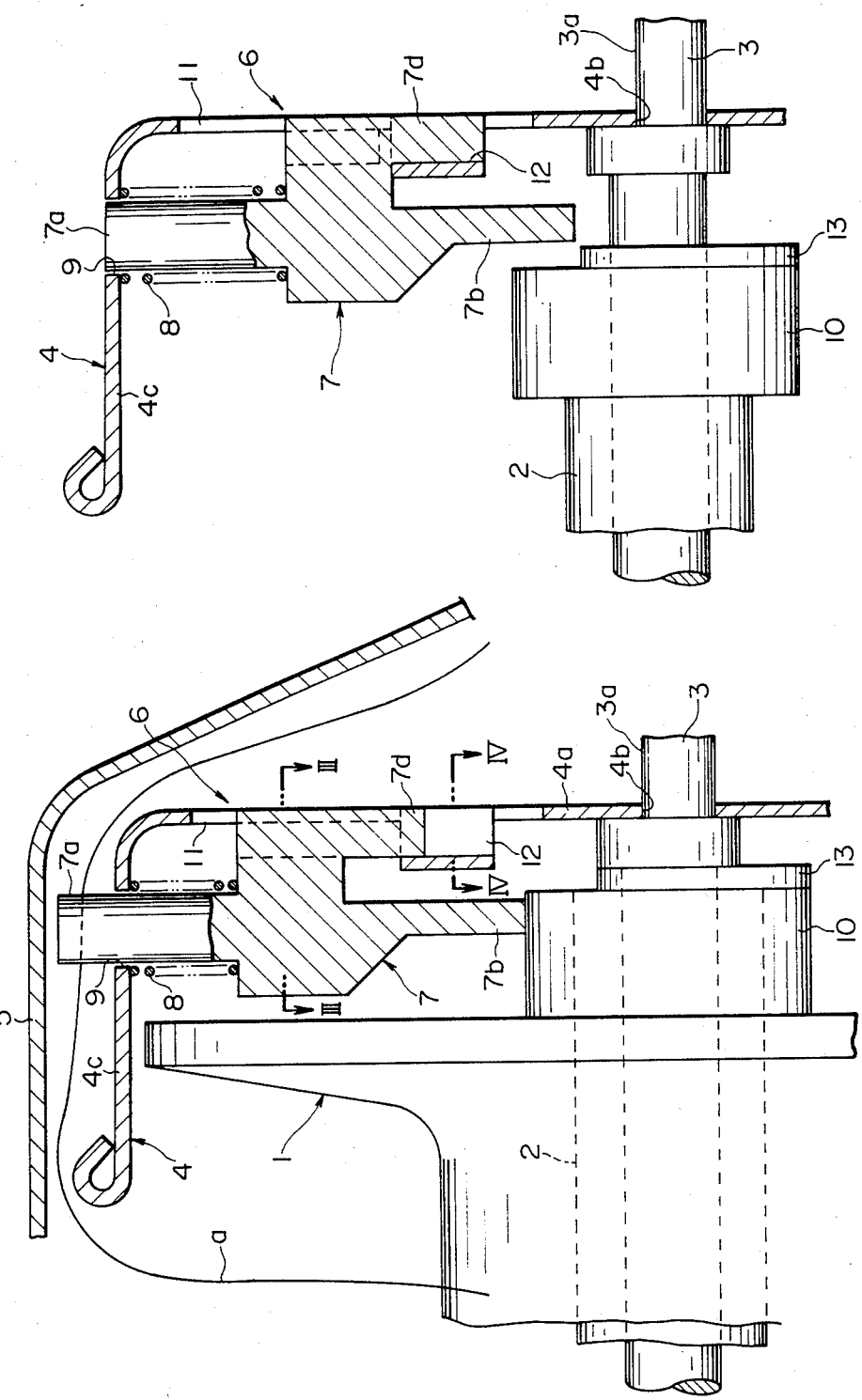

FISHING LINE ENGAGING AND RELEASING MECHANISM IN A CLOSED-FACE TYPE REEL

BACKGROUND OF THE INVENTION

The present invention relates to a fishing line engaging and releasing mechanism in a closed-face type fishing reel.

Conventional closed-face type reels have a fishing line engaging and releasing mechanism in the form of a line pickup member movably mounted on a rotor by a pin or a staked member. It has therefore been tedius and time-consuming to attach the pickup member. The pickup member thus mounted tends to become unstable and is relatively inaccurate in position. Furthermore, when the pickup member gets worn or damaged, it cannot easily be removed for replacement or repair.

SUMMARY OF THE INVENTION

It is accordingly an object of the present invention to provide a fishing line engaging and releasing mechanism for closed-face type reels which can be mounted in position with accuracy, remains stable in position, and can be removed when damaged or worn for easy replacement or repair.

According to the present invention, a fishing line engaging and releasing mechanism in a closed-face type reel is removably mounted on a rotor and comprises a pickup member having a pickup pin movable out of and retractable into a hole in a peripheral wall of the rotor for allowing a fishing line to be wound around and reeled out of a spool, and a spring acting between the pickup member and the peripheral wall for normally urging the pickup member radially inwardly, the pickup member including a tongue engageable with a sleeve for enabling the pickup pin to project out of the hole, and a back portion and a locking portion slidably and removably fitted respectively in the guide hole and the guide slot.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a side elevational view, partly in cross section, of a fishing line engaging and releasing mechanism in a closed-face type reel, the view being illustrative of the parts position in which a fishing line is wound up;

FIG. 2 is a view similar to FIG. 1, showing the mechanism in the position in which a fishing line is reeled out;

DETAILED DESCRIPTION

Figure 3:
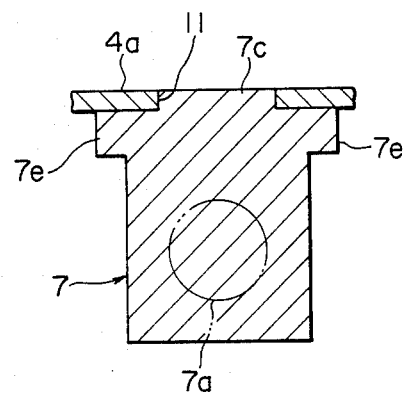
FIG. 3 is an enlarged cross-sectional view taken along line III—III of FIG. 1.

As shown in FIGS. 1 and 2, a closed-face type fishing reel comprises a spool 1 fixedly mounted by a tubular shaft 2 on a reel body (not shown), and a rotatable and displaceable shaft 3 extending through the tubular shaft 2, the shaft 3 being rotatable and axially displaceable by a handle and a pushbutton (not shown). The shaft 3 includes a portion 3a of a segmental cross-section extending through a complementary segmental hole 4b defined in a sidewall 4a of a rotor 4 to thereby fix the latter with respect to the shaft 3 for coaxial rotation therewith. A cover 5 is fixed to the reel body in surrounding relation to the rotor 4 and the spool 1. A fishing line a can be reeled out or wound up through a central opening (not shown) in the cover 5.

A line pickup member 7 having a line engaging pickup pin 7a is mounted on the rotor 4 and radially slidable under the resiliency of a spring 8 acting between the line pickup member 7 and a peripheral wall 4c of the rotor 4. The line engaging pickup pin 7a is movable out of and retractable into a hole 9 defined in the peripheral wall 4c. The line pickup member 7 also includes a tongue 7b engageable with a sleeve 10 fixed to the tubular shaft 2. When the tongue 7b engages the sleeve 10 as shown in FIG. 1, the line pickup member 7 is radially outwardly displaced to allow the pickup pin 7a to project out of the hole 9 to latch the line a. Coversely, when the tongue 7b disengages from the sleeve 10 as shown in FIG. 2, the line pickup member 7 is radially inwardly displaced to allow the pickup pin 7a to be retracted into the hole 9 for releasing the line a.

As illustrated in FIGS. 1 through 4, the sidewall 4a of the rotor 4 has a guide hole 11 and a guide slot 12 defined by a projection of the sidewall 4a extending axially inwardly, the guide hole 11 and the guide slot 12 communicating radially with each other. As shown in FIG. 5, the pickup member 7 also has a back portion 7c and a locking portion 7d which can fit respectively in the guide hole 11 and the guide slot 12, the locking portion 7d being dependent from the back portion 7c. The pickup member 7 is supported on the rotor 4 with the back portion 7c and the locking portion 7d slidably and removably fitted in the guide hole 11 and the guide slot 12, respectively.

The back portion 7c and the locking portion 7d and the guide hole 11 and the guide slot 12 are relatively positined such that they are interfitted with the pickup pin 7a inserted from below into the hole 9 in the rotor 4 and with the spring 8 interposed under compression between the pickup member 7 and the peripheral wall 4c. After the pickup member 7 has been fitted in position, it should not be removed out of fitting engagement when the tongue 7b is placed on the sleeve 10 as shown in FIG. 1.

The radial length of said guide hole is at least equal to the combined radial length of said back portion and said locking portion whereby said pickup member may be detached from said sidewall by shifting said pickup radially outwardly unitl said locking portion clears said guide slot to permit lateral movement of said back portion and of said guide hole.

The pickup member 7 further includes a pair of integral arms 7e, 7e extending laterally from the back portion 7c. When the back portion 7c is fitted in the guide hole 11, the arms 7e, 7e are held in slidable abutment against an inner surface of the sidewall 4a.

Figure 4:
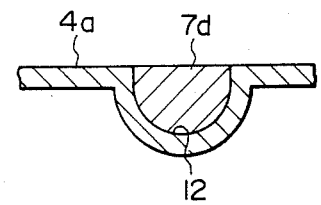
FIG. 4 is an enlarged cross-sectional view taken along line IV—IV of FIG. 1.
Figure 5:
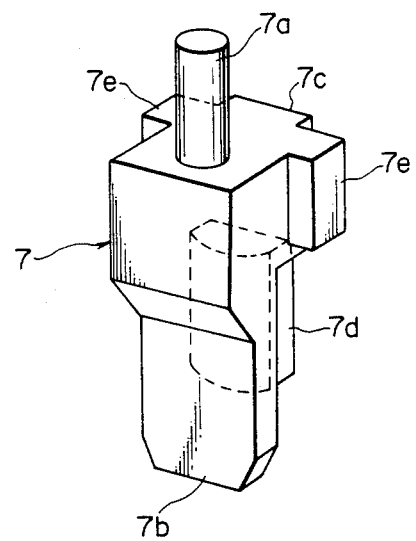
FIG. 5 is a perspective view of a line pickup member in the fishing line engaging and releasing mechanism.

As illustrated in FIGS. 4 and 5, the guide slot 12 and the locking portion 7d have complementary semicircular cross sections for interfitting engagement.

In FIGS. 1 and 2, the sleeve 10 has on its outer end an eccentric pickup cam 13 for lifting the pickup member 7.

In operation, the shaft 3 and the rotor 4 are held in the retracted position as shown in FIG. 1 under the force of a spring (not shown) mounted in the reel body. At this time, the tongue 7b of the pickup member 7 rests on the sleeve 10 with the pickup member 7 pushed radially outwardly while compressing the spring 8. The pickup pin 7a projects radially outwardly from the hole 9 in the rotor 4, and engages the fishing line a to permit the latter to be wound up on the spool 1 when the rotor 4 rotates.

When the shaft 3 and the rotor 4 is pushed forward by the non-illustrated pushbutton while the fishing line is being wound up, the tongue 7b is disengaged from the sleeve 10 as shown in FIG. 2 to permit the pickup member 7 to be slid radially inward toward the shaft 3 under the resiliency of the spring 8. Thus, the pickup pin 7a is withdrawn into the hole 9 to thereby release the line a, and the line can be reeled out.

When the pushbutton is released while the line is being reeled out, the shaft 3 and the rotor 4 are retracted under the bias of the spring in the reel body until the tongue 7b is brought into abutting engagment with a rear end face of the sleeve 10. Subsequent rotation of the rotor 4 causes the eccentric pickup cam 13 to lift the tongue 7b onto the outer circumference of the sleeve 10. Then, the pickup member 7 is brought into the position of FIG. 1, in which the line a can be wound up again.

With the arrangement of the present invention, the pickup member 7 can be attached to and removed from the rotor 4 with utmost ease for thereby reducing the cost of the reel. When the pickup pin 7a or other portions of the pickup member 7 are damaged, the latter can simply and easily be removed for replacement or repair. Since the back portion 7c and the locking portion 7d are supported respectively by inner edges of the guide hole 11 and the guide slot 12, the pickup member 7 is stably supported in position without suffering from any backlash, and hence the fishing line can be engaged and released smoothly.

Although a certain preferred embodiment has been shown and described, it should be understood that many changes and modifications may be made therein without departing from the scope of the appended claims.

What is claimed is:

1. A closed-face type reel comprising:

(a) a fixed shaft having a sleeve fixed thereto;
    (b) a spool mounted on said fixed shaft for winding a fishing line and a moveable shaft rotatably and axially moveable relative to said fixed shaft;
    (c) a rotor mounted on said moveable shaft, said rotor including a sidewall having a guide hole and a guide slot communicating radially with each other and a peripheral wall having a radially directed hole; and
    (d) a fishing line engaging and releasing mechanism removably mounted on said rotor and comprising a pickup member having a pickup pin moveable out of and retractable into said radially directed hole in said peripheral wall for allowing the fishing line to be wound around and reeled out of said spool respectively, and a spring acting between said pickup member and said peripheral wall for normally urging said pickup member radially inwardly, said pickup member including a tongue engageble with said sleeve for enabling said pickup pin to project out of said hole, and a back portion and a locking portion slidably and removably fitted respectively in said guide hole and said guide slot, wherein said guide slot and said locking portion have complementary semicircular cross sections with said guide slot being located on the side of said side wall adjacent said pickup member and wherein the radial length of said guide hole is at least equal to the combined radial length of said back portion and said locking portion whereby said pickup member may be detached from said side wall by shifting said pickup radially outwardly until said locking portion clears said guide slot to permit lateral movement of said back portion out of said guide hole.

2. A closed-face type reel according to claim 1, wherein said pickup member includes a pair of arms extending laterally from said back portion and slidable against said sidewall of said rotor on the side thereof adjacent said pickup member.

3. A closed-face type reel according to claim 1, wherein said sleeve has an eccentric cam engageable with said tongue for lifting the latter onto said sleeve.

* * * * *